US012403713B2

(12) United States Patent
Sano et al.

(10) Patent No.: US 12,403,713 B2
(45) Date of Patent: Sep. 2, 2025

(54) SCREEN PLATE

(71) Applicant: NBC MESHTEC INC., Tokyo (JP)

(72) Inventors: Hiroki Sano, Tokyo (JP); Seiji Amamori, Tokyo (JP); Nobukazu Motojima, Tokyo (JP)

(73) Assignee: NBC MESHTEC INC., Tokyo (JP)

( * ) Notice: Subject to any disclaimer, the term of this patent is extended or adjusted under 35 U.S.C. 154(b) by 0 days.

(21) Appl. No.: 18/268,676

(22) PCT Filed: Dec. 24, 2021

(86) PCT No.: PCT/JP2021/048163

§ 371 (c)(1),
(2) Date: Jun. 21, 2023

(87) PCT Pub. No.: WO2022/138907

PCT Pub. Date: Jun. 30, 2022

(65) Prior Publication Data

US 2024/0294027 A1 Sep. 5, 2024

(30) Foreign Application Priority Data

Dec. 25, 2020 (JP) ................................ 2020-217314

(51) Int. Cl.
*B41N 1/24* (2006.01)
*B41F 15/36* (2006.01)
*B41N 1/04* (2006.01)

(52) U.S. Cl.
CPC .............. *B41N 1/247* (2013.01); *B41F 15/36* (2013.01); *B41N 1/04* (2013.01)

(58) Field of Classification Search
CPC ............ B41N 1/247; B41N 1/04; B41F 15/36
See application file for complete search history.

(56) References Cited

U.S. PATENT DOCUMENTS

| | | | | |
|---|---|---|---|---|
| 5,365,840 A | | 11/1994 | Newman | |
| 5,855,733 A | * | 1/1999 | Douglas | D03D 15/25 100/295 |
| 2005/0095939 A1 | * | 5/2005 | Heiman | D03D 15/283 442/209 |

(Continued)

FOREIGN PATENT DOCUMENTS

| | | |
|---|---|---|
| EP | 3 456 534 | 3/2019 |
| JP | 6-278383 | 10/1994 |

(Continued)

OTHER PUBLICATIONS

Machine Translation WO2019176933 (Year: 2019).*

(Continued)

*Primary Examiner* — David H Banh
(74) *Attorney, Agent, or Firm* — Wenderoth, Lind & Ponack, L.L.P.

(57) ABSTRACT

A screen plate for screen printing is provided with a plate frame, a supporting body screen having an outer peripheral part fixed to the plate frame, and a printing screen having an outer peripheral part fixed to the supporting body screen. The supporting body screen is made of an n/m twilled weave textile, wherein n and m independently represent an integer of 2 or more. The screen plate has excellent printing accuracy.

4 Claims, 4 Drawing Sheets

(56) References Cited

U.S. PATENT DOCUMENTS

| | | | | |
|---|---|---|---|---|
| 2005/0130520 | A1* | 6/2005 | Mouri | D03D 1/02 442/59 |
| 2006/0079362 | A1* | 4/2006 | Tomobuchi | F16G 1/28 474/260 |
| 2008/0045105 | A1* | 2/2008 | Hara | D01F 1/103 442/200 |
| 2015/0159305 | A1* | 6/2015 | Booth | E02D 17/202 442/189 |
| 2015/0352830 | A1* | 12/2015 | Shi | B41N 1/247 101/127 |
| 2016/0121636 | A1* | 5/2016 | Shibusawa | C23C 14/34 101/127 |
| 2017/0130371 | A1* | 5/2017 | Harabayashi | D03D 11/02 |
| 2017/0217151 | A1 | 8/2017 | Cutcher, Jr. et al. | |
| 2020/0001642 | A1* | 1/2020 | Kurahashi | B41F 15/36 |
| 2020/0399821 | A1* | 12/2020 | Yoshioka | B07B 1/4618 |
| 2021/0140074 | A1* | 5/2021 | Yoshida | D03D 15/283 |

FOREIGN PATENT DOCUMENTS

| | | |
|---|---|---|
| JP | 2000-177262 | 6/2000 |
| JP | 2007-62225 | 3/2007 |
| JP | 2009-83120 | 4/2009 |
| JP | 2009-149024 | 7/2009 |
| JP | 2009-279899 | 12/2009 |
| JP | 5242034 | 7/2013 |
| JP | 2017-74757 | 4/2017 |
| JP | 2017-523927 | 8/2017 |
| JP | 2018-122599 | 8/2018 |
| KR | 20180088585 | 8/2018 |

OTHER PUBLICATIONS

WO 2019176933 (Year: 2019).*

International Search Report (ISR) issued Feb. 8, 2022 in International (PCT) Application No. PCT/JP2021/048163.

International Preliminary Report on Patentability issued Jun. 13, 2023 in corresponding International (PCT) Patent Application No. PCT/JP2021/048163.

Extended European Search Report issued Oct. 24, 2024 in corresponding European Patent Application No. 21911044.2, 9 pages.

* cited by examiner

EXAMPLE 1

COMPARATIVE EXAMPLE 1

EXAMPLE 1

COMPARATIVE EXAMPLE 1

(a) 2/1 TWILL (b) PLAIN

SCREEN PLATE

TECHNICAL FIELD

The present invention relates to a screen plate for screen printing, utilized in the precise pattern formation fields of electronics and the like, for example, a phosphor printing process during production of PDPs (plasma displays), electrode printing of solar cells, liquid crystal seal printing, fill printing of circuit boards, printing of electrodes and dielectrics of capacitors, and resist printing such as TAB (Tape Automated Bonding) and COF (Chip on Flexible).

BACKGROUND ART

In general, screen plates for use in screen printing are used with openings of predetermined shapes (openings of shapes corresponding to print patterns) being formed on mesh-like screens fixed to plate frames in the state of application of predetermined tension, by use of photosensitive resins (emulsions), metal plate and the like, and the openings being filled with inks (pastes). Such screen plates filled with inks are placed with screens being away at certain distances (clearances) from printing object surfaces, and the screens are temporarily brought into contact with the printing object surfaces by use of elastic deformation and are immediately released from the surfaces based on resilience to thereby apply inks (pastes) with which openings of shapes corresponding to the print patterns are filled, to the printing object surfaces. In such screen plates, certain tension is applied to the screens fixed to plate frames, in order that rapid release performance (plate releasability) of the screens from the printing object surfaces is ensured.

As such screen plates for use in screen printing, not only a "single screen plate" where one screen formed synthetic fibers or metal fibers is fixed to a plate frame, but also a "combination screen plate" and a "metal mask plate" are known.

The "combination screen plate" and the "metal mask plate" are each a screen plate having two screens: a support screen having an outer circumference portion thereof fixed to a plate frame, and a printing screen having an outer circumference portion thereof fixed to the support screen. While a woven fabric is used in both the support screen and the printing screen in the "combination screen plate", a woven fabric is used in the support screen and a metal plate is used in the printing screen in the "metal mask plate".

The "combination screen plate" and the "metal mask plate" can be each produced by, for example, stretching a woven fabric as a raw material of the support screen, on the plate frame, allowing the printing screen to adhere to a central portion, and removing the woven fabric (the raw material of the support screen) overlapped with the printing screen, on the central portion. For the "combination screen plate", a photosensitive resin is applied to a printing screen (a screen made of woven fabric), and then a predetermined area of the applied photosensitive resin is exposed to form predetermined-shaped opening(s) in the photosensitive resin for filling with ink, which is then used for screen printing. On the other hand, for the "metal mask plate", opening (s) of a predetermined shape are formed in advance on a printing screen (a screen formed from a metal plate) by etching, laser or the like. The "metal mask plate" is used for screen printing by using that opening (s) as opening (s) for filling with ink.

Since the combination screen plate and the metal mask plate each force the support screen to bear elongation due to the clearance during printing, the support screen here used is a woven fabric structure formed of a material high in elasticity, namely, low in Young's modulus and the printing screen here used is as a material high in Young's modulus so that deformation of an image pattern is suppressed, for example, a woven fabric structure which is formed of a metal fiber (Patent Literature 1), a metal plate (Patent Literature 2).

CITATION LIST

Patent Literature

Patent Literature 1: JP 2000-177262A

Patent Literature 2: JP2007-062225A

SUMMARY OF INVENTION

Technical Problem

In the combination screen plate and the metal mask plate, the support screen bears elongation due to the clearance during printing and thus is at least needed to be lower in Young's modulus than the printing screen. However, a problem is that, in the case of a conventional support screen constituted from a nylon fiber, a polyester fiber, or the like, the support screen is so low in Young's modulus that resistance to the displacement of an image formation portion due to a friction force along with slipping of a squeegee during printing is weak and no sufficient printing accuracy is obtained.

The present invention has been made in order to solve such problems, and an object thereof is to provide a screen plate having excellent printing accuracy.

Solution to Problem

The gist of the present invention is as follows.

[1] A screen plate for screen printing, comprising a plate frame, a support screen having an outer circumference portion fixed to the frame, and a printing screen having an outer circumference portion fixed to the support screen, wherein the support screen is formed of an n/m twill woven fabric, and n and m are each independently an integer of 2 or more.

[2] The screen plate according to [1], wherein n and m are each independently an integer of 5 or less.

[3] The screen plate according to [1] or [2], wherein n and m are the same integer.

[4] The screen plate according to any one of [1] to [3], wherein the support screen is the woven fabric composed of synthetic fibers.

[5] The screen plate according to any one of [1] to [4], wherein the printing screen is a woven fabric formed of a metal fiber, and the screen plate is a combination screen plate.

[6] The screen plate according to any one of [1] to [4], wherein the printing screen is formed of a metal plate, and the screen plate is a metal mask plate.

Advantageous Effect of Invention

According to the present invention, a screen plate having excellent printing accuracy can be provided.

DESCRIPTION OF EMBODIMENTS

Hereinafter, embodiments of the present invention are described in detail.

First, a screen plate of the present embodiment is described with reference to FIG. 1. A screen plate 100 illustrated in FIG. 1 is a combination screen plate in which a woven fabric is used in both a support screen 103 and a printing screen 102.

The screen plate 100 of the present embodiment has a plate frame 101, the support screen 103, and the printing screen 102.

An outer circumference portion 103*a* of the support screen 103 is fixed to the plate frame 101. An outer circumference portion 102*a* of the printing screen 102 is fixed to the support screen 103. A section to which the outer circumference portion 102*a* of the printing screen 102 is fixed is more specifically an inner circumference portion 103*b* of the support screen 103. The "outer circumference portion" herein refers to the region of an outer circumference and its edge region, and the "inner circumference portion" refers to the region of an inner circumference and its edge region.

Figure 1:
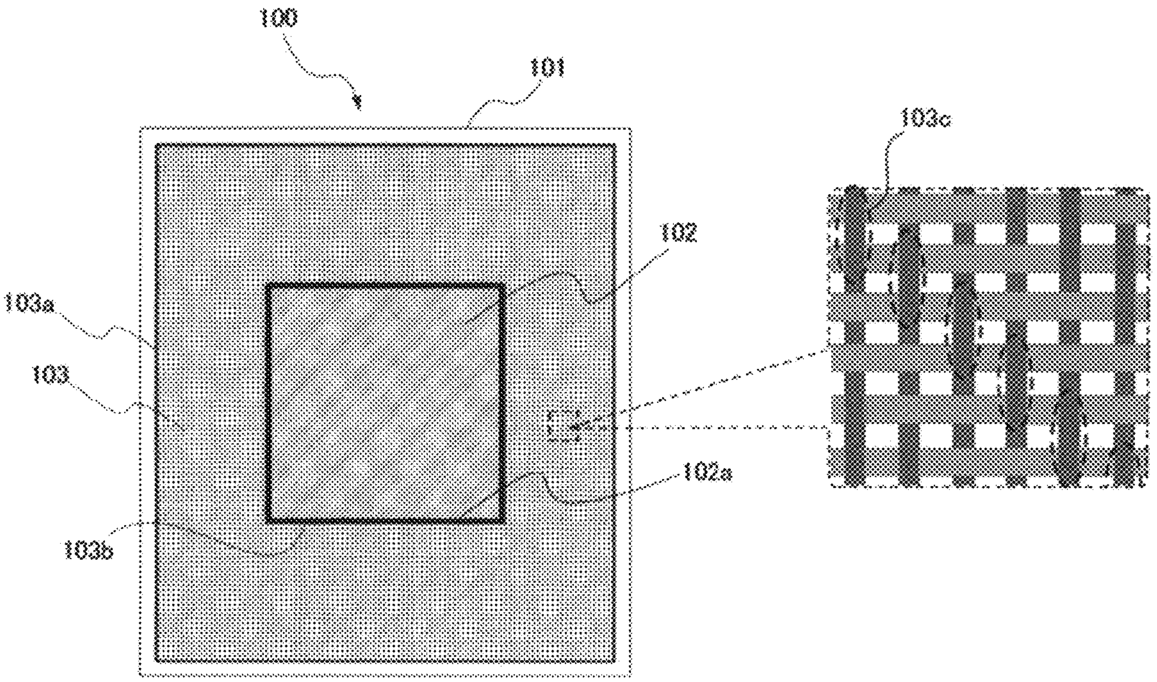
FIG. 1 is a schematic view of a screen plate (combination screen plate).

A position at which the printing screen 102 is placed corresponds to a central portion in a region surrounded by the plate frame 101 and a position at which the support screen 103 is placed corresponds to a periphery of the printing screen 102 in the region surrounded by the plate frame 101, as illustrated in FIG. 1. In other words, the screen plate 100 of the present embodiment has a structure in which the printing screen 102 as an inner mesh is supported by the plate frame 101 with the support screen 103 as an outer mesh being interposed therebetween.

The plate frame 101 has an important function to apply tension (for example, 21 N/cm to 36 N/cm) to the screens 102 and 103 and thus hold the screens, and is rectangularly formed so as to be capable of stretching the screens 102 and 103. The plate frame 101 also serves as a portion to be attached to a printing machine, and also has a role in preventing ink leakage during printing. The material of the plate frame 101, generally used, is wood, a resin, a square pipe made of metal such as aluminum, an aluminum alloy, iron and steel, and an iron alloy, or a die-casting material. In particular, an aluminum alloy is particularly widely used because of being lightweight and also enhancing strength, chemical resistance, and processability.

The material of the plate frame 101 for use in the present embodiment, here used, can be any material, and is desirably a metal stable to high tension, high in strength, and less deformed against the changes in temperature and humidity, such as an aluminum alloy or an iron alloy, in order to allow excellent printing accuracy to be exhibited. In the case of use of a metal square pipe jointed, such a pipe in which the wall thickness is increased or which is reinforced with a rib provided inside is desirable.

The printing screen 102 here used is a mesh (woven fabric) obtained by weaving each fiber (warp fiber, weft fiber). The printing screen 102 here used is preferably a metal mesh obtained by weaving a metal fiber having a fiber diameter of 20 μm or less, particularly in order that highly precise printing, namely, screen printing for formation of a fine print pattern is performed. Herein, the fine print pattern includes, for example, electrode wiring.

The fiber density in the printing screen 102 is not particularly limited, and is preferably 400 meshes or more from the viewpoint of an enhancement in resolution. The metal fiber usable in the printing screen 102 is suitably a metal fiber of stainless steel, tungsten which is a material high in strength, or the like. Each fiber (warp and weft fibers) constituting the printing screen 102 is not limited to any metal fiber. Each fiber (warp and weft fibers) constituting the printing screen 102 may be any material that can be made into fibers, such as high-strength synthetic fibers, glass fibers, or a combination or composite of these materials.

The Young's modulus of the printing screen 102 is not particularly limited, and is preferably 2000 N/mm$^2$ or more from the viewpoint of an enhancement in printing accuracy. Herein, the Young's modulus can be determined from a SS curve (stress-strain curve) obtained by a tensile test with the printing screen 102 or the support screen 103.

The function of the support screen 103 in the screen plate 100 of the present embodiment is to bear the external force applied to the printing screen 102 during printing and thus decrease deformation of the printing screen 102 as much as possible to thereby achieve highly accurate printing.

The support screen 103 for use in the screen plate 100 of the present embodiment is a woven fabric constituted from a warp fiber and a weft fiber, and a synthetic fiber is preferably used in the warp fiber and the weft fiber, from the viewpoint that the degree of elongation for bearing the external force applied to the printing screen 102 during printing is ensured. The synthetic fiber is not particularly limited, and a fluorine-based fiber, polyethylene terephthalate, polypropylene, 6-nylon, 66-nylon, polyethylene, an ethylene-vinyl acetate copolymer, polycarbonate, polyphenylene sulfide (PPS), polyethylene naphthalate, polyether ether ketone, modified polyphenylene ether (PPE), or the like can be used. Moreover, aramid, polyarylate, ultra-high molecular weight polyethylene, polyparaphenylene benzobisoxazole (PBO), polyparaphenylene benzobisthiazole (PBT), polyparaphenylene benzobisimidazole (PBI), a carbon fiber, another liquid crystal polymer, or two or more materials, for example, a core-in-sheath composite fiber may also be used. A film- or sheet-shaped woven fabric composite may also be used in which one or more synthetic resin films are laminated to thereby integrate a woven fabric and a synthetic resin.

The synthetic fiber usable in the support screen 103 may be a monofilament or a multifilament, or may be, for example, a combination of a multifilament as a warp fiber and a monofilament as a weft fiber. The cross section shape of the synthetic fiber usable in the support screen 103 can be any shape, for example, besides a usual round cross section, variant cross sections such as flat, hollow, porous, triangular, and cruciform cross sections.

The diameter of each fiber (warp fiber and weft fiber) constituting the support screen 103 is not particularly limited, and can be, for example, 20 μm to 100 μm, and is preferably 35 μm to 70 μm from the viewpoint of adhesion with an inner mesh. The fiber density in the support screen 103 is not particularly limited, and is preferably 100 to 300 meshes from the viewpoint of adhesion with an inner mesh.

The woven fabric constituting the support screen 103 is an n/m twill woven fabric, and n and m are each independently an integer of 2 or more. The "n/m twill" refers to the twill where passing of a warp fiber over n weft fibers and then under m weft fibers is repeated (or passing of a weft fiber over n warp fibers and then under m warp fibers is repeated). The twill is a weaving system characterized by the formation of a linear (band-like) pattern called twill line, which is inclined with respect to the warp or weft fibers, by shifting the area 103*c* where the warp fiber passes over the weft fiber (or the weft fiber passes over the warp fiber) by a specified distance in the longitudinal direction between adjacent warps (or in the lateral direction between adjacent weft fibers).

The support screen 103 illustrated in FIG. 1 is constituted from a 2/2 (n=2, m=2) twill woven fabric. In the 2/2 twill woven fabric, passing of a warp fiber over two weft fibers and then under two weft fibers is repeated (or passing of a weft fiber over two warp fibers and then under two warp fibers is repeated), as illustrated in the partially enlarged view of FIG. 1.

The support screen 103 is constituted from the n/m (n and m are each independently an integer of 2 or more) twill woven fabric to result in an increase in Young's modulus of the support screen 103 as compared with the case of constitution from a plain (weaving system where n and m are each 1) woven fabric or a 2/1 twill woven fabric. An increase in Young's modulus of the support screen 103 hardly causes deformation of the support screen 103 (namely, hardly causes elongation of the support screen 103) even under application of an external force to the printing screen 102 during printing. Thus, the screen plate 100 of the present embodiment can hardly cause displacement of the printing screen in a direction parallel to a printing object surface during screen printing, can facilitate formation of a print pattern at a desired position, and can suppress the change in shape of a print pattern generated due to displacement of the printing screen on a printing object surface. In addition, an increase in Young's modulus of the support screen 103 allows the printing screen 102 to be easily rapidly released from a printing object surface during printing, and also enables the distance (clearance) between the printing screen 102 and a printing object surface to be smaller. Accordingly, the screen plate 100 of the present embodiment can allow for high-precision printing.

Figure 7:
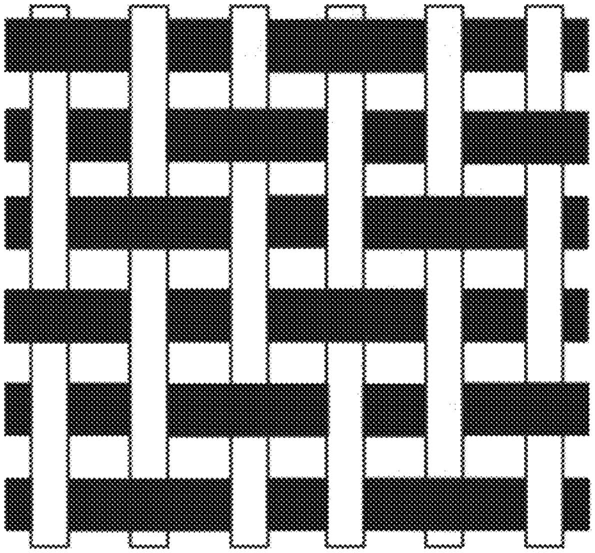
FIG. 7 illustrates respective partially enlarged views of a 2/1 twill woven fabric (a) and a plain woven fabric (b).
Figure 7:
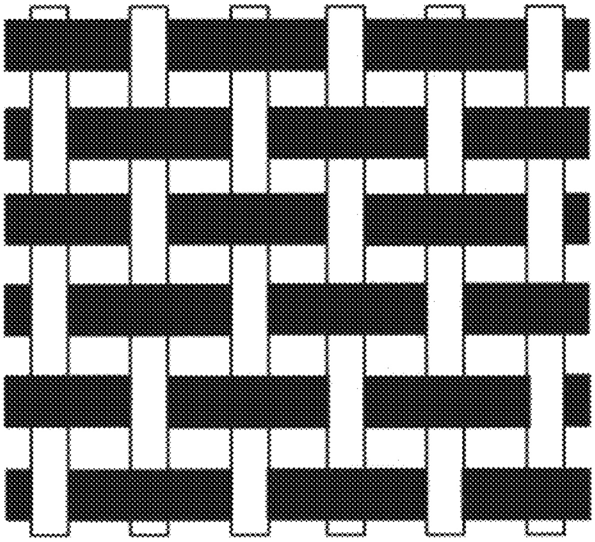

Herein, the 2/1 twill woven fabric is a twill woven fabric (woven fabric, n=2, m=1) where passing of a warp fiber over two weft fibers and then under one weft fiber is repeated (or passing of a weft fiber over two warp fibers and then under one warp fiber is repeated), as illustrated in FIG. 7(*a*). On the other hand, the plain weave fabric is a woven fabric (woven fabric, n=1, m=1) where passing of a warp fiber over one weft fiber and then under one weft fiber is repeated, as illustrated in FIG. 7(*b*).

The Young's modulus of the support screen 103 may be in any range as long as it can bear an external force applied to the printing screen 102 during printing (namely, any range as long as it is lower than the Young's modulus of the printing screen 102), and is more preferably higher as long as it can bear an external force applied to the printing screen 102 during printing. The Young's modulus of the support screen 103 is preferably 800 N/mm$^2$ or more from the viewpoint of plate releasability. The rupture strength of the support screen 103 is preferably 500 N/5 cm or more from the viewpoint that rupture is hardly caused by tension applied to the screens 102 and 103 and an external force applied to the printing screen 102 during printing. The rupture strength of the support screen 103 is more preferably higher, and the upper limit value thereof can be, for example, 1000 N/5 cm. Herein, the rupture strength can be obtained by the tensile test according to JIS L1096.

The woven fabric constituting the support screen 103 may be an n/m (n and m are each independently an integer of 2 or more) twill woven fabric, and n and m may be the same integer or different integers and more preferably n and m are the same integer. When n and m are the same integer, the front and rear surfaces of the support screen 103 are not distinguished and handleability can be enhanced.

Since fiber bending is decreased as the values of n and m in the woven fabric constituting the support screen 103 are larger, mechanical characteristics of the support screen 103, for example, the Young's modulus and the strength thereof are enhanced. Thus, while n and m are more preferably larger, too large n and m easily cause fiber deviation where a warp fiber is deviated in a lateral direction and/or a weft fiber is deviated in a longitudinal direction. Thus, n and m are each preferably an integer of 5 or less. Herein, the "fiber bending" refers to bending in a vertical direction of a warp fiber passing a weft fiber, or bending in a vertical direction of a weft fiber passing a warp fiber.

Particularly preferable combinations of n and m are a combination of 2(n) and 2(m) and a combination of 3(n) and 3(m) from the viewpoint of a more enhancement in printing accuracy.

The screen plate 100 of the present embodiment is used in screen printing for formation of a print pattern on a printing object surface. The method of using the screen plate 100 of the present embodiment in screen printing is the same method as the method with respect to a conventionally known screen plate, is not particularly limited, and can be, for example, the following method.

Figure 2:
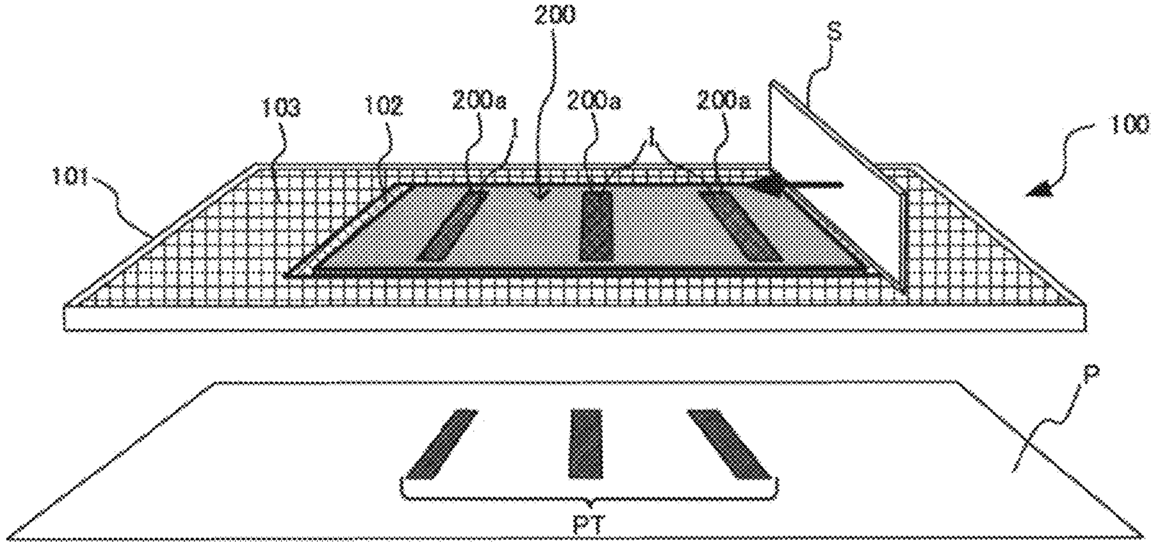
FIG. 2 is a diagram for explaining a usage method of a screen plate (combination screen plate).

First, a photosensitive resin 200 is applied to the printing screen 102 of the screen plate 100, as illustrated in FIG. 2. Thereafter, a predetermined region of the photosensitive resin applied is subjected to light exposure, and thus not only the photosensitive resin 200 is cured, but also an opening 200*a* is formed in the photosensitive resin 200. The photosensitive resin 200 may be a negative photosensitive resin in which a region subjected to light exposure is easily dissolved in a developer, or may be a positive photosensitive resin in which a region subjected to light exposure is hardly dissolved in a developer.

Next, the opening 200*a* formed in the photosensitive resin 200 is filled with an ink I to allow the ink I to be retained in the printing screen 102 exposed from the opening 200*a*. A squeegee S is moved with being pressed to the printing screen 102 so that the printing screen 102 in which the ink I is retained is brought into contact with a printing object surface P. The printing screen 102 pressed to the printing object surface P is released from the printing object surface P according to movement of the squeegee S, and thus the ink I retained in the printing screen 102 is transferred to the printing object surface P. Such treatment can allow for formation of a print pattern PT by the screen plate 100 of the present embodiment.

Next, the method for manufacturing the screen plate 100 of the present embodiment is described.

The screen plate 100 of the present embodiment can be manufactured by a manufacturing method including a first fixation step of fixing the outer circumference portion (section corresponding to the outer circumference portion 103*a* of the support screen 103) to the plate frame 101 in the state of application of predetermined tension to the n/m (n and m are each independently an integer of 2 or more) twill woven fabric (raw material of the support screen 103), a second fixation step of overlapping the printing screen 102 on the twill woven fabric stretched on the plate frame 101 and fixing the outer circumference portion 102*a* to the twill woven fabric, and a removal step of removing a partial region of the twill woven fabric overlapped with the printing screen 102.

A screen tensioner can be used for application of predetermined tension to the twill woven fabric (raw material of the support screen 103) in the first fixation step. Specifically, each section in four side directions of the twill woven fabric is sandwiched by a clamp of a tensioner, the clamp is pulled by use of mechanical or pneumatic pressure for regulation to predetermined tension and a predetermined bias angle, and the outer circumference portion (section corresponding to the outer circumference portion 103*a* of the support screen 103) of the twill woven fabric is fixed to the plate frame 101. The bias angle refers to an acute angle among angles between a warp fiber 3*a* or a weft fiber 3*b* and the plate frame 2.

In order to fix the outer circumference portion of the twill woven fabric to the plate frame 101 in the first fixation step, and/or fix the outer circumference portion 102*a* of the printing screen 102 to the twill woven fabric in the second fixation step, for example, an adhesive can be used. Examples of the adhesive can include rubber-based, epoxy-based, urethane-based, and cyano acrylate-based adhesives, but are not particularly restricted in the present embodiment, and the adhesive may be selected in consideration of the material of the fibers used in the screens 102 and 103, the material of the plate frame 101, a solvent component contained in the ink used, and the like.

The position at which the printing screen 102 is stacked on the twill woven fabric in the second fixation step is not particularly limited as long as it is a position overlapped with the twill woven fabric, and is preferably placed in the central portion of the twill woven fabric stretched on the plate frame 101 from the viewpoint of a further enhancement in printing accuracy.

For example, a cutter or laser can be used in order to remove a partial region of the twill woven fabric overlapped with the printing screen 102 in the removal step. In the removal step, a partial region of the twill woven fabric, overlapped with the printing screen 102 is removed; however, if the twill woven fabric is not overlapped with any region of the printing screen 102 filled with the ink, the entire region of the twill woven fabric overlapped with the printing screen 102 is not required to be removed. In the removal step, a partial region of the twill woven fabric is removed and thus the twill woven fabric serves as the support screen 103.

The screen plate 100 of the present embodiment can be produced by the above-mentioned production method. In the production method, a reduction in tension may occur because of removal of a partial region of the twill woven fabric, and a reduction in printing accuracy due to a reduction in tension can be suppressed by applying high tension and stretching the twill woven fabric to the plate frame 101 in advance.

The method for producing the screen plate 100 of the present embodiment is not limited to the above-mentioned method. For example, a method may be adopted which involves obtaining the support screen 103 in which the outer circumference portion 102*a* of the printing screen 102 is fixed to the inner circumference portion 103*b*, in advance before stretching on the screens 102 and 103 to the plate frame 101, and fixing the outer circumference portion 103*a* to the plate frame 101 in the state of application of predetermined tension to the support screen 103.

The screen plate 100 of the present embodiment, in which the n/m (n and m are each independently an integer of 2 or more) twill woven fabric is used as the support screen 103, can allow for an increase in Young's modulus of the support screen 103, as compared with the screen plate in which the plain woven fabric or the 2/1 twill woven fabric is used as the support screen 103. Thus, a screen plate 100 excellent in printing accuracy can be provided.

While the combination screen plate (screen plate 100) in which the woven fabric is used as the printing screen 102 is described in the above embodiment, the screen plate 100 of the present embodiment may be a metal mask plate in which a metal plate is used as the printing screen 102.

Figure 3:
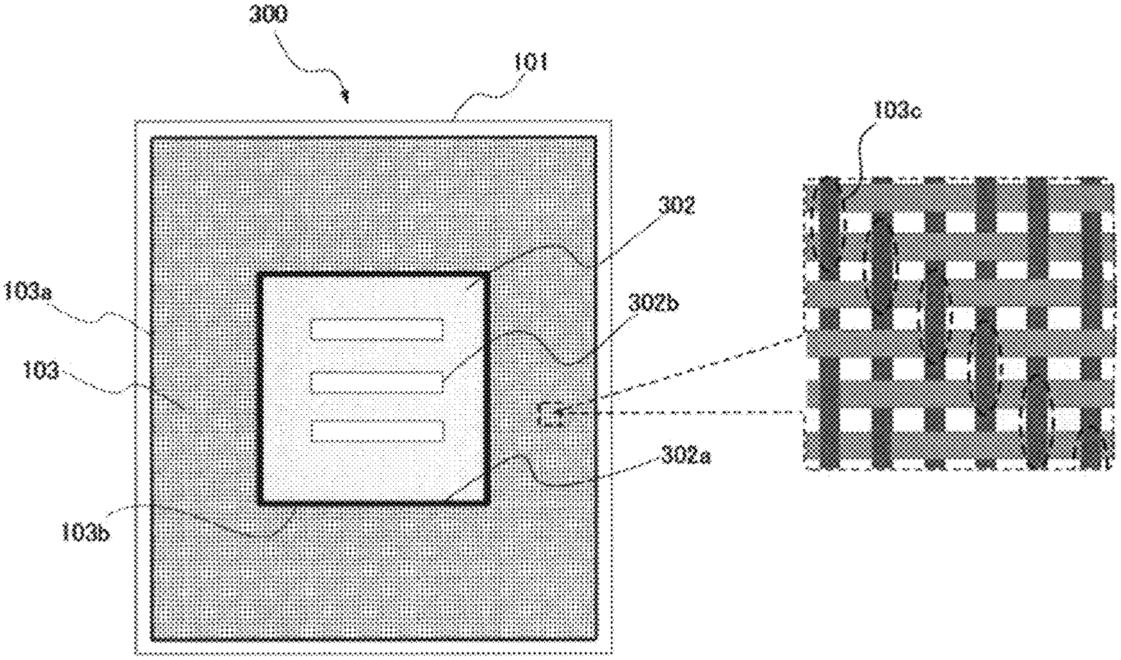
FIG. 3 is a schematic view of a screen plate (metal mask plate).

FIG. 3 illustrates one example of a metal mask plate (screen plate 300) in which a metal plate is used as the printing screen 102. The same constituents as those of the screen plate 100 illustrated in FIG. 1 are marked with the same symbols in the screen plate 300 illustrated in FIG. 3, and the descriptions thereof are omitted.

As illustrated in FIG. 3, a metal plate is used as a printing screen 302 in the screen plate 300. An outer circumference portion 302*a* of the printing screen 302 is fixed to the inner circumference portion 103*b* of the support screen 103, as in the printing screen 102 of the screen plate 100.

The raw material of the metal plate constituting the printing screen 302 is not particularly limited, and any metal such as stainless steel, phosphor bronze, nickel, copper, or aluminum can be used. The thickness of the metal plate constituting the printing screen 302 can be appropriately set depending on the thickness of a print pattern to be formed, is not particularly limited, and can be, for example, 20 μm to 1000 μm.

An opening 302*b* having a shape corresponding to a shape of a print pattern to be formed is formed in the metal plate constituting the printing screen 302. The opening 302*b* is filled with an ink when screen printing is performed.

The method for obtaining the metal plate with the opening 302*b* formed is not particularly limited, and a conventionally known method can be used. Examples of such a conventionally known method can include a method for forming an opening in a metal plate by etching treatment or laser treatment, and a method for obtaining a metal plate with the opening 302*b* formed, by an electroforming method.

The screen printing using the screen plate 300 is performed by filling the opening 302*b* of the printing screen 302 (metal plate) with an ink, and transferring the ink retained in the opening 302*b*, to the printing object surface P. The method for transferring the ink to the printing object surface P is the same method as in the case of use of the screen plate 100, and thus the description thereof is omitted. In the screen printing using the screen plate 300, the opening 302*b* having a shape corresponding to a shape of a print pattern is formed in the printing screen 302 in advance and thus formation of the opening 200*a* by the photosensitive resin 200 can be omitted unlike the case of the screen plate 100.

The method for producing the screen plate 300 is the same as the method for producing the screen plate 100 except that the metal plate with the opening 302*a* formed is used as the printing screen 302, and thus the detailed description thereof is omitted.

An n/m (n and m are each independently an integer of 2 or more) twill woven fabric is used as the woven fabric constituting the support screen 103 in the screen plate 300 described above, as in the case of the screen plate 100. Thus, the screen plate 300 of the present embodiment can allow for an increase in Young's modulus of the support screen 103, as compared with the screen plate in which the plain woven fabric or the 2/1 twill woven fabric is used as the support screen 103. Thus, a screen plate 300 excellent in printing accuracy can be provided.

EXAMPLES

Next, the present invention is more specifically described with reference to Examples. However, the present invention is not limited to only these Examples.

Example 1

An aluminum frame body (hollow structure having an outer dimension of 320 mm×320 mm, an inner dimension of 270 mm×270 mm, a thickness of 15 mm, and a wall thickness of 2 mm) was prepared as the plate frame. A tungsten screen (W40 430-13, manufactured by NBC Metalmesh Inc.) in which a metal fiber made of tungsten, having a diameter of 13 μm, was woven for 430 meshes was prepared as the raw material of the printing screen. A 2/2 twill polyester screen (EX225HD2/2, manufactured by NBC Meshtec Inc., trade name: EX screen) in which a polyester fiber having a diameter of 55 μm was woven for 225 meshes was prepared as the raw material of the support screen. The tungsten screen as the raw material of the printing screen had a Young's modulus of 13110 $N/mm^2$ as a slope between 100 N and 200 N in an SS curve in a tensile test performed, and the polyester screen as the raw material of the support screen had a Young's modulus of 925 $N/mm^2$ in the same manner.

An adhesive was applied to the outer circumference portion of the polyester screen (support screen) prepared, and the outer circumference portion of the polyester screen was fixed to the plate frame in the state of application of predetermined tension to the polyester screen. After an adhesive was applied to the outer circumference portion of the tungsten screen (printing screen) prepared, the tungsten screen was overlapped on the central portion of the polyester screen stretched on the plate frame and the outer circumference portion of the tungsten screen, to which the adhesive was applied, was fixed to the polyester screen. A region (220 mm×220 mm) of the polyester screen overlapped with the tungsten screen was removed to thereby obtain a screen plate of Example 1. Herein, the polyester screen and the tungsten screen were fixed so that the warp fiber (or weft fiber) to the plate frame was inclined at 23°.

Figure 4:
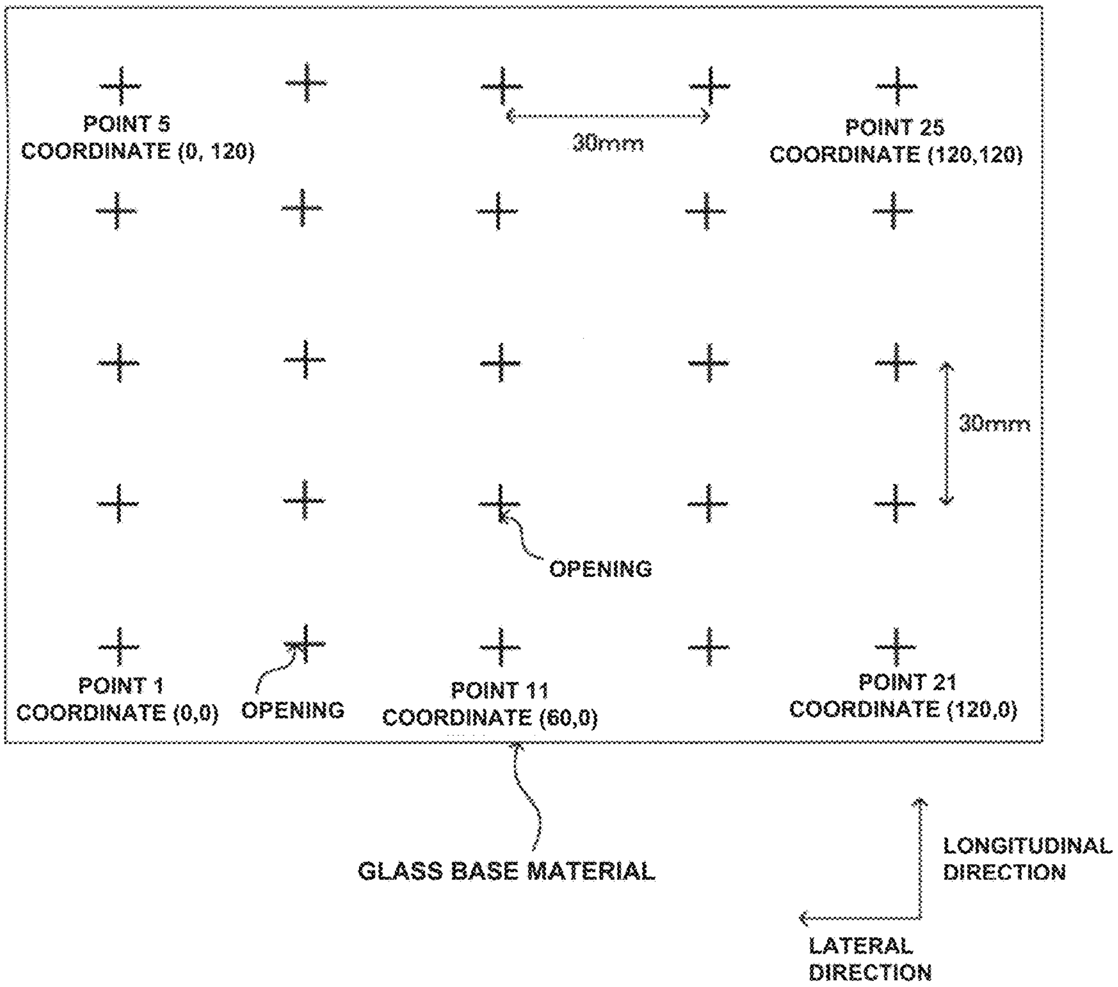
FIG. 4 is a diagram for explaining an opening formed on a glass base material.

A glass base material having a thickness of 10 μm was fixed in a predetermined region of the printing screen (tungsten screen) in the screen plate of the present Example, and a photosensitive silver halide-containing silver emulsion was applied thereto. Next, a predetermined region to which the silver emulsion was applied was subjected to light exposure (or laser lithography) to form a cured film of the silver emulsion. A region where no cured film was formed was etched with a chemical to form openings in the glass base material. Such each opening having a cruciform shape in planar view (when viewed in a thickness direction) was formed in the glass base material fixed to the printing screen, at an interval of 30 mm at five points in a longitudinal direction and a lateral direction (25 in total), as illustrated in FIG. 4. The line width in such each opening having a cruciform shape was 130 μm.

The screen plate was placed so that the printing screen was opposite to a printing object surface, and evaluation of printing accuracy, described below, was performed. The tension at the central portion of the printing screen was 30 N/cm by measurement with Tension gauge STG-80A (manufactured by Protec Engineering), and the distance (clearance) between the printing screen and the printing object surface was 1.1 mm.

Comparative Example 1

A screen plate of Comparative Example 1 was made by the same method as that of Example 1 except that EX225HD2/1 (manufactured by NBC Meshtec Inc.) as 2/1 twill, in which a polyester fiber having a diameter of 55 μm was woven for 225 meshes, was used as the support screen, and then each opening was formed in a predetermined region of the glass base material fixed to the printing screen. The tension at the central portion of the printing screen was 30 N/cm by measurement with Tension gauge STG-80A (manufactured by Protec Engineering), and the distance (clearance) between the printing screen and the printing object surface was 1.1 mm. EX225HD2/1 as the raw material of the support screen had a Young's modulus of 845 $N/mm^2$ as a slope between 100 N and 200 N in an SS curve in a tensile test performed.

(Printing Accuracy)

The screen plates of Example 1 and Comparative Example 1 were each used to perform screen printing 3000 times. The screen printing was here performed by filling the opening formed in the glass base material, with an ink, to retain the ink in the printing screen, and transferring the ink retained in the printing screen to a printing object surface by movement of a squeegee being pressed to the printing screen. Each print pattern on the 10-th and 3000-th print objects was used to evaluate the printing accuracy by an evaluation method described below.

<Evaluation Method>

The intersection of the cruciform was defined as the reference point with respect to each opening formed in the glass base material. Such each reference point was numbered, and the coordinate depending on the distance between the reference points (hereinafter, referred to as "reference coordinate") was set. Specifically, a reference point 1 was defined as a coordinate (0,0), and respective coordinates depending on the distance from the reference point 1 were set as reference points 1 to 25. Such each coordinate in the present evaluation was the two dimensional orthogonal coordinate between a lateral direction (X) and a longitudinal direction (Y), and such each coordinate was set with a length measuring machine SQ-9000 (manufactured by SHASHINKAGAKU).

The intersection of each cruciform formed as print patterns on the 10-th and 3000-th print products was defined as an evaluation point, and such each evaluation point was marked with the same number as that of the corresponding reference point. The coordinate of an evaluation point 11 was set to a coordinate (60,0) of the corresponding reference point 11, and coordinates depending on the distance from the evaluation point 11 were respectively set to evaluation points 1 to 10 and 12 to 25 (hereinafter, each coordinate at evaluation points 1 to 25 is referred to as "evaluation coordinate").

The evaluation coordinate and the reference coordinate were compared, and the amount of displacement (width of displacement) of the print pattern at each of the points 1 to 25 was determined from the difference between the coordinates at such each point.

Figure 5:
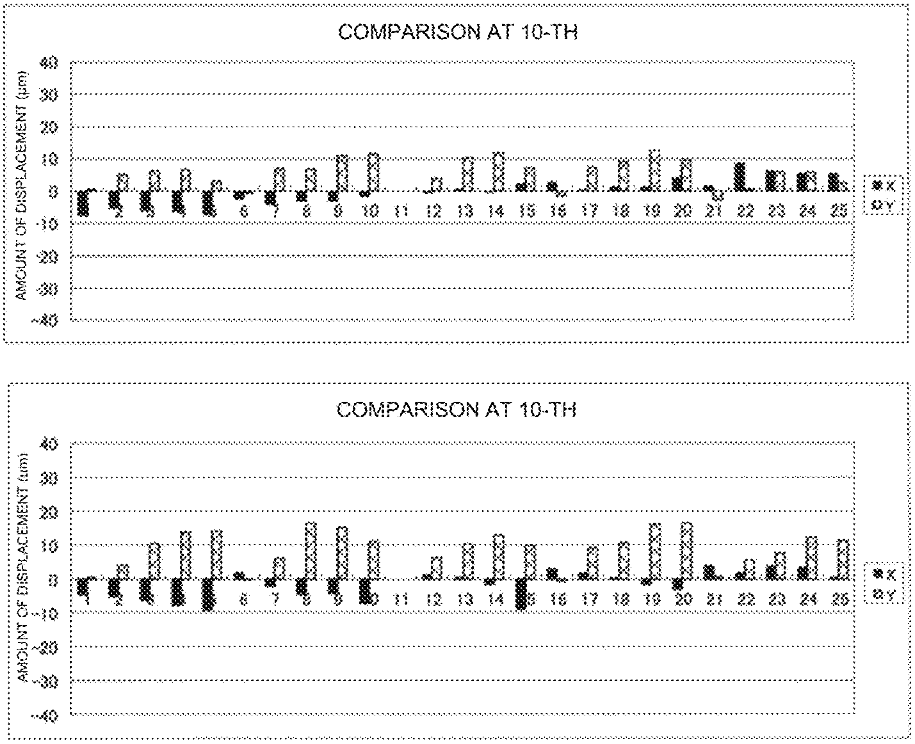
FIG. 5 illustrates graphs each representing the amount of displacement with respect to the 10-th print product.
Figure 6:
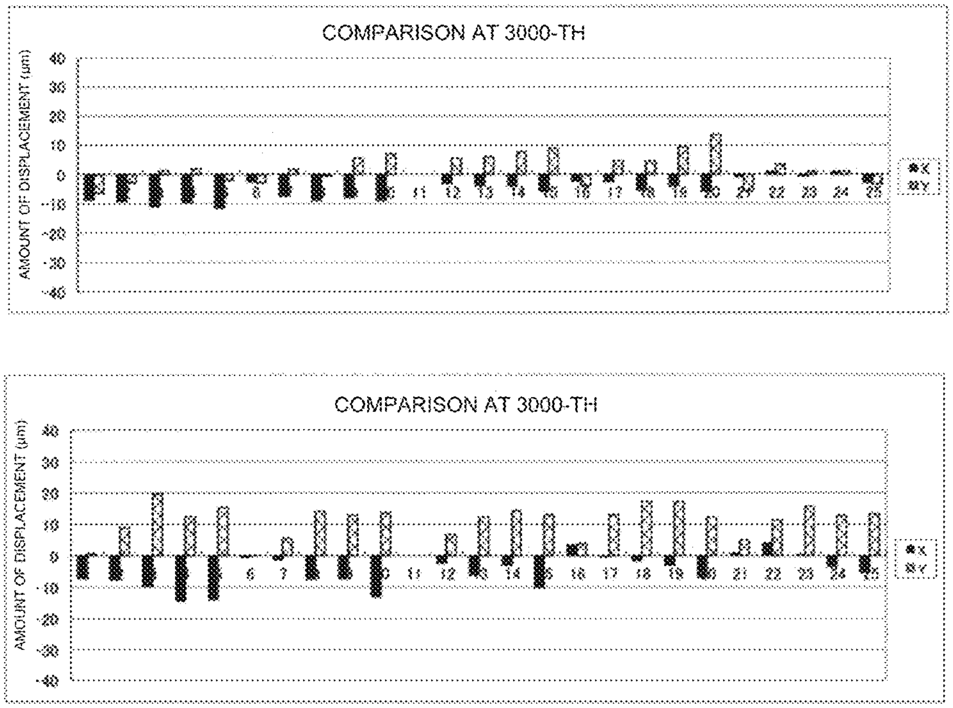
FIG. 6 illustrates graphs each representing the amount of displacement with respect to the 3000-th print product.

The evaluation results with respect to the 10-th print product are illustrated in FIG. 5, and the evaluation results with respect to the 3000-th print product are illustrated in FIG. 6. In FIG. 5 and FIG. 6, the vertical axis represents the amount of displacement and the horizontal axis represents the number of each point. X in FIG. 5 and FIG. 6 represents the amount of displacement in a lateral direction (hereinafter, referred to as "amount of displacement X"), and Y in FIG. 5 and FIG. 6 represents the amount of displacement in a longitudinal direction (hereinafter, referred to as "amount of displacement Y"). In FIG. 5 and FIG. 6, the amount of displacement, being a positive figure, means an increase in evaluation coordinate value as compared with the reference coordinate value, and the amount of deviation, being a negative figure, means a decrease in evaluation coordinate value as compared with the reference coordinate value.

Table 1 below shows the average value of the amount of displacement in each of the 10-th and 3000-th print products. The average value of the amount of displacement was determined with the amount of displacement X and the amount of displacement Y illustrated in FIG. 5 and FIG. 6, from the following expression (1).

$$A = \left(\sum_{n=1}^{25} \sqrt{(xn)^2 + (yn)^2}\right) \div 25 \qquad (1)$$

In the expression (1), A represents the average value of the amount of displacement, xn represents the amount of displacement X at point n, and yn represents the amount of displacement Y at point n.

TABLE 1

| Average value (μm) of amount of displacement | 10-th | 3000-th |
|---|---|---|
| Example 1 | 7.7 | 7.4 |
| Comparative Example 1 | 10.1 | 12.6 |

As seen from Table 1, the screen plate of Example 1 hardly occurred in positional deviation of the print pattern even in both the 10-th and 3000-th screen printings, as compared with the screen plate of Comparative Example 1. It could be understood from the results that the screen plate of Example 1 had excellent printing accuracy.

The invention claimed is:

1. A screen plate for screen printing, comprising:
a plate frame;
a support screen having an outer circumference portion fixed to the plate frame; and
a printing screen having an outer circumference portion fixed to the support screen, wherein
the support screen is formed of an n/m twill woven fabric,
n and m are each independently an integer of 2 or more,
the support screen is a woven fabric formed of a synthetic fiber,
the printing screen is a woven fabric formed of a metal fiber,
the screen plate is a combination screen plate,
the printing screen has a predetermined region which is to be filled with ink during screen printing, and
the support screen has an opening formed by removing a partial region of the support screen, and the printing screen is arranged such that the predetermined region is exposed via the opening in the support screen.

2. The screen plate according to claim 1, wherein n and m are each independently an integer of 5 or less.

3. The screen plate according to claim 1, wherein n and m are the same integer.

4. A screen plate for screen printing, comprising:
a plate frame;
a support screen having an outer circumference portion fixed to the plate frame; and
a printing screen having an outer circumference portion fixed to the support screen, wherein
the support screen is formed of an n/m twill woven fabric,
n and m are each independently an integer of 2 or more,
the support screen is a woven fabric formed of a synthetic fiber,
the printing screen is formed of a metal plate,
the screen plate is a metal mask plate,
the printing screen has a predetermined region which is to be filled with ink during screen printing, and
the support screen has an opening formed by removing a partial region of the support screen, and the printing screen is arranged such that the predetermined region is exposed via the opening in the support screen.

* * * * *